United States Patent [19]

Kerr

[11] 4,193,624

[45] Mar. 18, 1980

[54] PORTABLE WASTE CONTAINER

[76] Inventor: David J. Kerr, 536 Belgrove Dr., Kearny, N.J. 07032

[21] Appl. No.: 844,462

[22] Filed: Oct. 21, 1977

[51] Int. Cl.² ............................................. A47K 13/06
[52] U.S. Cl. .................... 294/19 R; 294/1 R; 15/104.8; 15/257.6
[58] Field of Search ............ 294/1 R, 19 R, 55, 50.9, 294/53.5; 15/104.8, 257.1, 257.2, 257.6; 119/1 R

[56] References Cited

U.S. PATENT DOCUMENTS

| 674,516 | 5/1901 | Olson | 15/257.6 |
|---|---|---|---|
| 1,353,222 | 9/1920 | Dietzel | 15/104.8 |
| 3,868,135 | 2/1975 | Magliaro | 294/1 R |

Primary Examiner—James B. Marbert
Attorney, Agent, or Firm—Carella, Bain, Gilfillan & Rhodes

[57] ABSTRACT

Apparatus for collecting the waste material of animals and in particular dogs is disclosed to include a tray having a collection compartment and a deodorant compartment, cover means displaceable between tray covering and tray uncovering positions, a handle for providing portability to the apparatus and means connecting the handle to the tray cover for displacing the tray cover between covered and uncovered positions in response to movement of the handle.

4 Claims, 4 Drawing Figures

PORTABLE WASTE CONTAINER

BACKGROUND OF THE INVENTION

This invention relates to apparatus for improving the environment. More specifically, this invention is directed to the collection of waste materials from animals and the elimination thereof prior to the waste materials being deposited on the ground or otherwise polluting the environment.

In recent years great emphasis has been placed on the improvement of the environment. Federal and State laws have been enacted which are directed to the elimination of air pollution, the elimination of water pollution, minimization of exposure to toxic substances, elimination of noise pollution and a myriad of other polluting agents. These laws emphasize the recent attention given to our environment and the many ways in which it has been fouled.

To a great extent, however, the manner in which a boiler stack fouls the environment or the manner in which a stream may be polluted escapes the day-to-day experience of the average person. It will quickly be recognized, however, that there is one form of pollution which we have all experienced, i.e. the deposit of waste matter of animals, particularly dogs, in a location where someone invariably will step. Who among us has not bee victimized in this manner? Who among us has not contributed to the proliferation of pollution by tracking waste materials on our shoes to the nearest appropriate scraping point for removal? Who among us has not been frustrated by the failure of diligent attempts to remove lingering odors? It is unlikely that anyone has escaped this distasteful experience.

The problem, of course, has been recognized over the years. Various ingenious inventors have directed their attentions to its solution. In this regard, for the most part, the solutions have embodied concepts of training the animal to deposit only in a particular location, providing equipment which is suitable for lifting animal deposits shortly after placement and, less desirably, the acknowledgement that the problem is a municipal one and thus the posting of appropriate signs such as "curb your dog."

Certainly none of these solutions is acceptable. The maintenance of litter bins and the like is a difficult task and, notwithstanding the best efforts of the maintainer, result in an unpleasant situation. Equipment for removing a once deposited discharge is ordinarily not 100% efficient. As a result, some unsuspecting soul can be strolling in a perfectly public place and experience, albeit only with a relatively small amount of discharge, the unpleasant occurrence of waste deposit on one's shoes, or less desirably on one's bare feet. Needless to say, the curbing of one's dog only concentrates the danger zone while tolerating the maintenance of discharge materials in the street at virtually all times with their attendant foul odors and possibility of being in the way of an errant foot.

The present invention is directed to an apparatus which eliminates the problems attendant to the above-described structures and procedures. More specifically, the present invention directs itself to an apparatus, conveniently used, for collecting animal solid waste materials before they hit the ground.

SUMMARY OF THE INVENTION

It is an object of the present invention, therefore, to provide an apparatus for the collection of animal solid waste materials subsequent to their discharge by the animal and prior to their deposit on the earth.

A further object of the present invention is to provide an apparatus for the collection of animal solid waste material which permits economical and efficient collection and disposition of animal solid waste materials.

A still further object of the present is to provide an apparatus for the collection of animal solid waste materials which is easily portable and susceptible of efficient manipulation by man, woman, or child.

These objects and others not enumerated are achieved by the apparatus of the present invention, one embodiment of which may include a tray having a waste material collection compartment and a deodorant compartment, a cover for the tray which is displaceable between a covering and an uncovering position, a handle for carrying the tray from place to place and to make the apparatus thus portable and a linkage means between the cover and the handle to permit displacement of the cover from the covering to the uncovering position in response to movement of the handle. It is also contemplated by this invention that the waste compartment of the tray may be provided with a disposable liner in order to facilitate, in a sanitary manner the disposition of the animal solid waste material.

BRIEF DESCRIPTION OF THE DRAWINGS

A more complete understanding of the present invention may be had from the following detailed description thereof, particularly when read in the light of the accompanying drawings, wherein.

DETAILED DESCRIPTION

As stated above this invention is directed to an apparatus for collecting the waste materials of animals and in particular, the waste materials of animals such as dogs. The apparatus is specifically designed to permit collection of the waste material subsequent to the evacuation of the material from the animal and prior to the deposit of the waste material on the earth.

Figure 1:
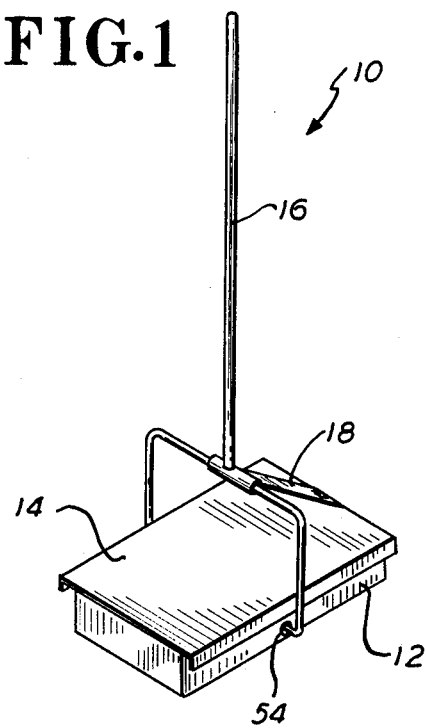
FIG. 1 is a perspective view of apparatus according to the invention with the cover in the closed or covering position.

Referring therefore to FIG. 1, an apparatus according to the invention is shown in perspective view and designated generally by the reference numeral 10.

Apparatus 10 can be seen to comprise a tray section 12, a cover section 14, a handle 16 and a link member 18, the link member being pivotally attached to cover 14 and handle 16 as is discussed below in detail.

Figure 3:
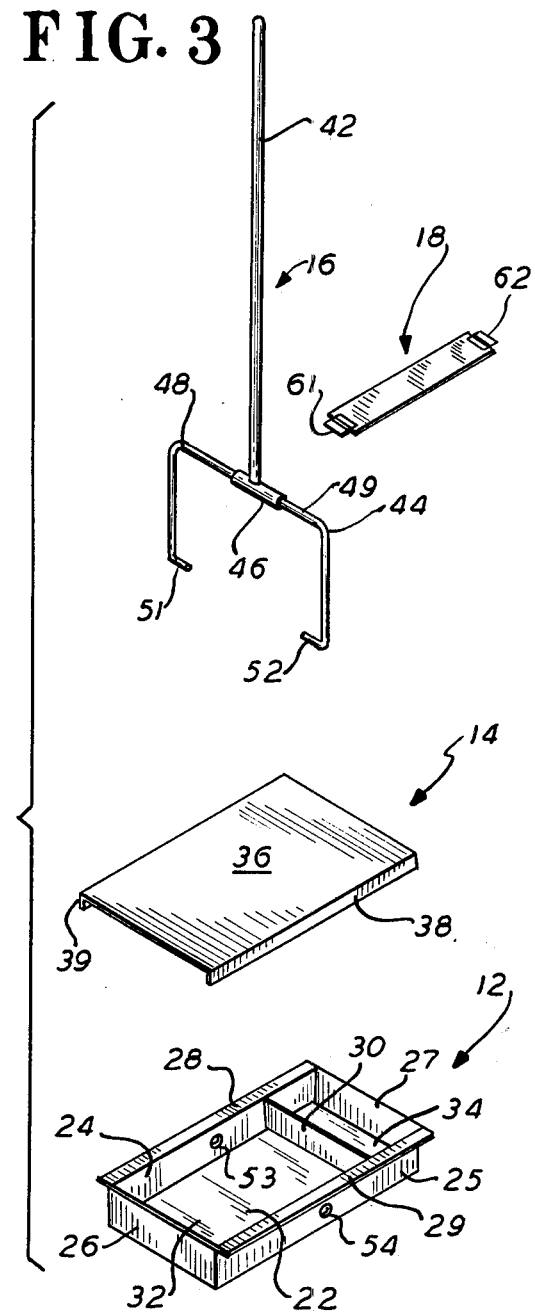
FIG. 3 is an exploded view of apparatus according to the invention showing the individual parts.

As best may be seen in FIG. 3, tray element 12 is a generally rectangular structure having a bottom wall 22, a first pair of opposed parallel sidewalls 24 and 25 and second pair of opposed parallel sidewalls 26 and 27.

The respective pairs of opposed parallel sidewalls are secured to the peripheral edges of bottom wall 22 and are further rigidly secured to each other along their intersecting edges. Thus the respective pairs of opposed parallel sidewalls cooperate with bottom wall 22 to define a major cavity.

As best may be seen from FIG. 3, parallel opposed sidewalls 24 and 25 are provided with outwardly extending flanges 28 and 29, respectively. Flanges 28 and 29 define slide support surfaces for cover 14 during the operation of apparatus 10.

Extending generally normally between opposed parallel sidewalls 24 and 25 is a partition 30. Partition 30 is rigidly secured at its ends to opposed parallel sidewalls 24 and 25 and along its bottom to bottom wall 22.

Partition 30 divides the major cavity or tray 12 into a waste material compartment 32 and a deodorant material compartment 34. The positioning of partition 30 is not critical and may be chosen to most suitably facilitate the construction as desired.

Tray element 12 may be manufactured from any of the many generally known materials suitable for manufacturing structures of this type. Thus it may be a molded plastic material, it may be sheet metal or it may be some other material depending upon the particular desires of the manufacturer.

As best may be seen in FIG. 3, slidable cover 14 is a generally rectangular element having a cover sheet 36 which is sized to be slightly wider than the distance between the external edges of flanges 28 and 29 and to be slightly longer than the lengths of opposed parallel sidewalls 24 and 25. The edges of cover 14 adjacent flanges 28 and 29 are provided with downwardly depending flanges 38 and 39 which preclude transverse displacement of cover 14 with respect to tray 12 but which do not interfere with sliding of tray 12 longitudinally i.e. in the direction of parallel opposed sidewalls 24 and 25. Further, the dependency of flanges 38 and 39 is such as to not interfere with cover 14 being able to tilt with respect to tray 12 during operation of apparatus 10 from a position such as that shown in FIG. 1 to a position such as that shown in FIG. 2.

Secured to cover 14 adjacent one transverse edge thereof is one leaf of a hinge which cooperates with remaining hinge structure to pivotally connect cover 14 with link 18 as is discussed below. It should also be recognized that link 18 may be provided with an integral pintle to cooperate with barrel structure on cover 14 to effect the desired pivotal connection.

Referring now primarily to FIGS. 1 and 3, handle 16 can be seen to comprise a hand pole 42, a yoke 44 and a T element 46. T element 46 is provided with a longitudinally extending bore in which to receive first and second dowel elements 48 and 49 which cooperate to define yoke 44. Thus, element 48 and 49 are rigidly secured within the longitudinally extending bore such that their orientation is contained in a single plane and their lower ends 51, 52 respectively cooperate to define a tong effect. In this regard, lower ends 51 and 52 are spaced apart by a distance substantially equal to the distance between opposed parallel sidewalls 24 and 25 of tray 12. Further, ends 51 and 52 are adapted to be received within pintle retainer elements 53, 54 which are mounted on the external surface of opposed parallel sidewalls 24 and 25 at the substantial midpoint between opposed parallel sidewalls 26 and 27. Thus, by reason of the relationship between ends 51 and 52 and pintle receiving elements 53 and 54, tray 12 is pivotally mounted with respect to handle 16.

Formed in the transversely extending portion of T element 46 is a threaded bore for receiving handle pole 42. Thus, handle pole 42, T element 46 and yoke sections 48 and 49 are assembled to define a single rigid unit which is pivotable with respect to tray 12 and which cooperate to define the overall handle structure 16.

One side of T element 46 is adapted to mount a hinge leaf which comprises part of a hinge structure 61 mounted on link 18 to cause handle 16 to be pivotally connected with link 18.

In this regard, link 18 is a relatively flat elongated member having hinge elements 61 and 62 mounted on opposed transversely extending edges. Hinge element 62 is operatively connected to cover 14 and hinge element 61 is operatively connected to T element 46. The length of link 18 is that length which is substantially equal to the distance between the transverse edge of cover 14 and the surface of T element 46 when handle structure 16 is disposed perpendicularly to the plane of bottom wall 22 of tray 12.

All of the elements of apparatus 10 may be made from materials which are conventionally available and using techniques which are well known in the art. Thus standard handle poles may be used for pole 42, plastic or metal materials are perfectly suitable and even wood is acceptable. Further, the apparatus may be constructed using manufacturing techniques which are well known in the art.

Considering therefore the manner of use of apparatus 10, it is contemplated that the user carry apparatus 10 by handle 16 as he walks the animal to be guarded. Ordinarily, if the animal is trained well, apparatus 10 need be carried only during those times when it can be expected that its use will be necessary.

Figure 2:
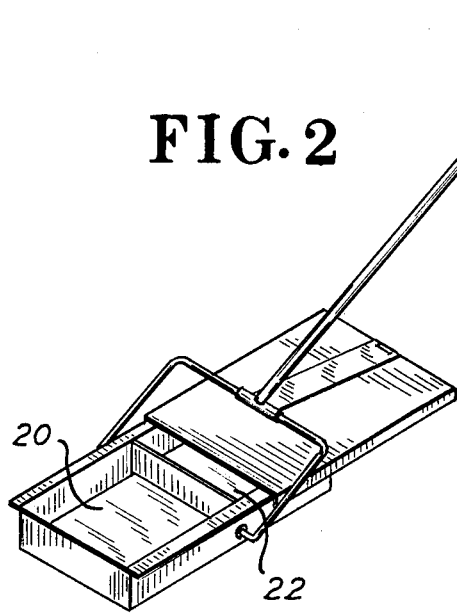
FIG. 2 is a perspective view of apparatus according to the invention with the cover in the uncovered or material catching position.

When it is determined that the animal is about to evacuate, apparatus 10 is placed on the ground and handle 16 is rotated from the position shown in FIG. 1 to the position shown in FIG. 2 so as to uncover waste compartment 20. Thereafter, the apparatus is positioned in the drop zone so that waste materials are caught in waste compartment 20 prior to hitting the ground. Upon completion of the event, handle 16 is rotated from the position shown in FIG. 2 to the position shown in FIG. 1 thereby to cover the now full or at least partially full waste compartment 20.

Upon returning home, the waste materials may then be disposed of in an acceptable manner and thus, the grounds, lawns, sidewalks and the curb have been spared despoilation.

Figure 4:
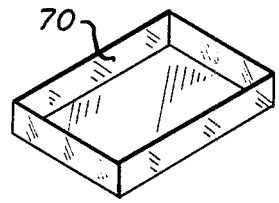
FIG. 4 is a prospective view of an insert to be utilized in conjunction with the present invention.

It should be noted that waste compartment 20 may be lined with a disposable liner such as liner 70 shown in FIG. 4. In this regard, the liners may be made from readily disposable materials, inserted in waste compartment 20 prior to use and, subsequent to use, disposed with the waste material in the conventional manner. Still further, liner 70 may be provided with a snap-type top (not shown) to totally encase the waste material as may be desirable for certain modes of disposal.

It should also be noted that appropriate deodorant material may be placed in compartment 22 to overcome offensive odors which may be emitted from the waste materials.

Apparatus 10 is a preferred embodiment of apparatus according to the invention. It will be recognized, however, that various modifications may be made to the disclosed preferred embodiment without departing from the spirit and the scope of the invention.

What is claimed is:

1. Apparatus for collecting animal waste products comprising:

a tray, said tray including a generally rectangular bottom wall, a first pair of parallel side walls secured to said bottom wall along opposed edges thereof, a second pair of parallel side walls secured to said bottom wall along opposed edges thereof, said pairs of side walls being secured to each other along their respective lines of intersection, said bottom wall and said opposed pairs of side walls cooperating to define a main chamber open at its top and further including a partition wall extending between and secured to said first pair of side walls, said partition wall for dividing said main chamber into a waste compartment and a deodorant compartment;

cover means for selectively covering and uncovering said waste compartment and said deodorant compartment of said tray;

handle means pivotally secured to said tray for supporting said tray in carrying said tray from place to place for use; and link means connected to said handle and said cover means, said link means for causing displacement of said cover means for said tray between covering and uncovering positions in response to rotation of said handle means.

2. Apparatus according to claim 1 wherein said link means is hingedly connected at one end to said handle means and at its opposed end to said cover means.

3. Apparatus according to claim 1 wherein said tray includes pintle receiving means rigidly secured to the external surface of said first pair of parallel side walls and said handle means includes a yoke, said yoke having ends which are pivotally received within said pintle receiving means whereby to rotatably mount said handle means on said tray.

4. Apparatus according to claim 1 and further including a liner means for said waste compartment, said liner comprising a disposable element for removing waste products collected in said waste compartment.

* * * * *